United States Patent [19]
Marbot et al.

[11] Patent Number: 5,848,109
[45] Date of Patent: Dec. 8, 1998

[54] APPARATUS AND PROCESS FOR SAMPLING A SERIAL DIGITAL SIGNAL

[75] Inventors: Roland Marbot, Versailles; Jean-Claude Le Bihan, Montrouge; Andrew Cofler; Anne Pierre Duplessix, both of Paris; Pascal Couteaux, Ecouen; Reza Nezamzadeh-Moosavi, Bois d'Arcy, all of France

[73] Assignee: Bull S.A., Puteaux, France

[21] Appl. No.: 510,458

[22] Filed: Aug. 2, 1995

[30] Foreign Application Priority Data

Aug. 4, 1994 [FR] France .................................. 94 09683

[51] Int. Cl.⁶ .................................................. H03B 3/04
[52] U.S. Cl. ........................... 375/355; 327/161; 375/373
[58] Field of Search ..................................... 375/355, 373, 375/376; 341/54, 70, 100, 112; 327/141, 161, 162, 163

[56] References Cited

U.S. PATENT DOCUMENTS

| | | | |
|---|---|---|---|
| 4,039,748 | 8/1977 | Caron et al. | 178/69.1 |
| 4,131,854 | 12/1978 | Schollmeier | 328/63 |
| 4,881,059 | 11/1989 | Saltzberg | 341/70 |
| 4,972,443 | 11/1990 | Sarkoezi | 375/110 |
| 5,001,729 | 3/1991 | Tjahjadi et al. | |
| 5,268,937 | 12/1993 | Marbot | 375/121 |

FOREIGN PATENT DOCUMENTS 0 466 593 A1   1/1992   European Pat. Off. .

OTHER PUBLICATIONS

Patent Abstracts of Japan vol. 13, No. 544 (E-855) 6 Dec. 1989 & JP-A-12 023 887 (Matsushita Electric Ind Co) 6 Sep. 1989 *abstract*.

Patent Abstracts of Japan vol. 8, No. 49 (E-230) 6 Mar. 1984 & JP-A-58 204 651 (Nippon Denki K.K.) 29 Nov. 1983 *abstract*.

*Primary Examiner*—Wellington Chin
*Assistant Examiner*—Jean B. Corrielus
*Attorney, Agent, or Firm*—Kerkam, Stowell, Kondracki & Clarke, P.C.; Edward J. Kondracki, Esq.

[57] ABSTRACT

A process and apparatus for sampling a serial digital signal (D), which includes phasing of the digital signal with a clock signal (C) and sampling the digital signal at delayed instants (Si), wherein the phasing is carried out in reference to the sampling instants. The phasing includes determining phasing test instants (Pi) which refer to the sampling instants (Si) to verify whether transitions of the digital signal are leading or lagging in phase relative to the phasing test instants. The determination of the phasing test instants is achieved by adding to each sampling instant (Si) a delay $Y=kR/2$, in which k is a positive whole odd number other than zero and R designates a pulse repetition period of the bits of the digital signal (D). The invention has particular utility in data processing and remote data processing systems, and to telecommunication systems.

44 Claims, 7 Drawing Sheets

APPARATUS AND PROCESS FOR SAMPLING A SERIAL DIGITAL SIGNAL

BACKGROUND OF THE INVENTION

The present invention relates to processes and apparatus for sampling a serial digital signal. The present invention is particularly for use in sampling high-speed digital transmissions, faster than one gigabit per second, and it specifically applies to the receivers in a serial digital transmission system, to data processing systems, for example for transmitting data between a processor and a memory or cache memory, to long-distance telecommunication systems and private communication systems such as local networks or Wide Area Networks, as well as to remote data processing systems. The subject of the invention is a process and apparatus for sampling a serial signal which first includes the step of phasing the digital signal with a clock signal. The invention further relates to a sampling process for integrated circuits and a system which implements this process.

The following European patent applications, EP-A-0441684, EP-A-0466591, EP-A-0466592, and EP-A-0466593 relate to a system for the transmission of serial digital data. The first document, EP-A-0441684, describes a phase locked loop circuit and a frequency multiplier which serve as the basis for the structure of the transmission system described in the other three documents, listed above. The system disclosed in these patent applications essentially has the double advantage of being particularly suited to high-speed digital transmission, since it avoids the conventional use of a voltage-controlled oscillator (VCO), and of having a simple structure for reliable operation. The second European patent application noted above discloses a transmission process which comprises adding respective edges into the transmitted words (ordinarily eight-bit bytes), which serve as both synchronization signals and clock signals. In the receiver, these edges are used to reconstruct the clock signal used for emission. Actually, this technology was originally developed for data processing systems, particularly multi-processor systems, in which the designer controls all the components and desires to optimize the principle parameters. The above identified European applications disclose one form of this type of optimization. However, in the applications of this technology to other fields, especially telecommunications, no one controls the entire system. In these fields, it is therefore essential to conform to one of the principle market standards, currently, for example, the ATM (Asynchronous Transfer Mode) or FibreChannel standard; But none of these standards uses a synchronization edge and a clock edge in each word of the digital signal.

The technique of using these edges in the digital signal has the advantage of not imposing any constraints on the operating mode of two remote stations which interact by means of this signal through a serial link. The stations can operate, and emit over the link, at different frequencies. Multiprocessor data processing systems can integrate processors from various sources and different generations. In this case, this heterogeneity can be managed by using this technique, and protocols can be developed at a higher level. In telecommunications, on the other hand, each station is sequenced by a high-precision internal clock with a known frequency, set by the standard. Therefore, the emitter and the receiver operate at this standard frequency. Under these conditions, the receiver knows the clock frequency used for the emission and the receiver does not have to reconstruct the clock signal. The only task remaining for the receiver is to phase the digital signal received with the internal clock signal. Edges, for example the synchronization and clock edges in the receiver of the system, described in the above-mentioned European patent applications, are chosen as references in the signal received and are phased with the corresponding edges of the clock signal. Once this phasing is carried out, the receiver performs a sampling of the digital signal after a predetermined delay relative to the reference edges. The sampling takes place in an area of maximum stability of the signal following each reference edge in order to obtain an optimal determination of the logic value of each bit. If the pulse repetition period of the bits transmitted serially by means of the digital signal is called R. the delay between the edge of a received signal and the best sampling instant is ordinarily equal to R/2 or R/2+nR, in which n is a positive whole number. This conventional sampling process has several drawbacks.

First of all, this type of sampling process requires that the clocks have a very precise frequency in order to assure perfect correspondence between the clock used for emission and the clock used for reception. However, clocks are ordinarily made from quartz, which exhibits certain technological dispersions and certain drifts pursuant to the operating conditions such as temperature, etc. A deviation between the emission and reception clocks is cumulative and disturbs the phasing. Moreover, between emission and reception, the signal is subject to a delay which depends on the length of the transmission line. This length is ordinarily quite variable and unknown. The phasing must therefore be very efficient. The sampling may, therefore, occur outside an area of stability of the signal received and thus it can furnish a false value for the bits read. In order to obtain a correct sampling for a throughput on the order of one gigabit per second, a clock precision on the order of, for example, $10^{-6}$, is currently required.

SUMMARY OF THE INVENTION

A primary object of the instant invention is to eliminate the disadvantages associated with conventional sampling processes, and to adapt the transmission system described in the above-mentioned documents to market standards, in order to combine the advantages of this system with those of the standards. In other words, the subject of the invention is a sampling process which can tolerate a lower clock precision while allowing simple, efficient phasing, which also assuring reliable reconstruction of the data received.

More particularly, the object of the instant invention is to provide a process for sampling a serial digital signal, which includes phasing of the digital signal with a clock signal and a sampling of the digital signal at delayed instants, wherein the phasing is carried out in reference to the sampling instants.

Another object of the invention is a serial digital transmission system which implements the process of the invention and provide an integrated circuit incorporating a serial digital receiver which implements the instant process.

DESCRIPTION OF THE DRAWINGS

The characteristics and advantages of the instant invention appear in the description which follows, given by way of example, and in reference to the appended drawings, in which.

DETAILED DESCRIPTION OF THE PREFERRED EMBODIMENTS

Figure 1:
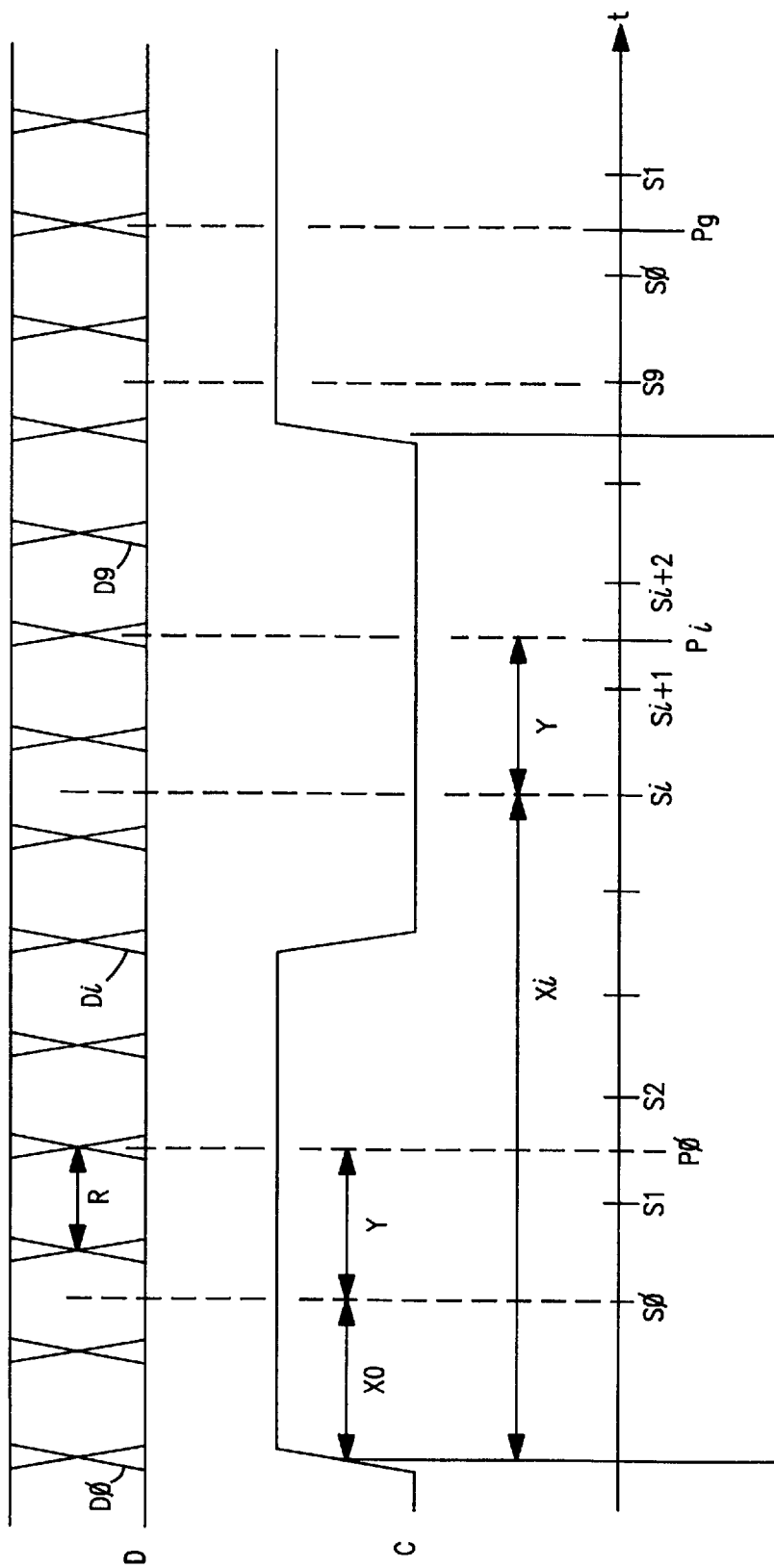
FIG. 1 shows a timing diagram which illustrates a preferred example of the sampling process according to the instant invention.

FIG. 1 schematically represents a serial digital data signal D and a clock signal C. The bits of the digital signal D enter a receiver at a pulse repetition period R, and the clock signal C, which serves as a reference in the receiver, has a period T which is a multiple of R, ten times greater in the example illustrated (T=10R). FIG. 1 also represents the sampling instants S0–S9, which recur at the period R. of ten successive bits of the data signal, in order to determine their logic value. All ten sampling instants Si (S0–S9) refer to the same edge of the clock signal C in the period T, the ascending edge in FIG. 1, and are determined in relation to this edge by ten (10) respective delays Xi (X0–X9). An example of the generation of these signals may be found in the above-mentioned prior European patent documents, in which the delays Xi are generally defined by the relation $Xi=kR/2+iR$, in which k is a positive whole odd number other than 0 and i designates a positive whole number or 0 which refers to the number of bits in the signal D in each period T. According to the invention, the delays Xi are variable values near an average value which verifies the preceding relation. In the example in FIG. 1, $i=\{0, 1, \ldots, 9\}$ and k=3, so the average sampling instants Si illustrated are defined by the relation $Si=3R/2+iR$. This average value assumes that the digital signal D is perfectly phased and synchronized with the clock signal C, as illustrated in FIG. 1, in which the reference edge of the clock signal C is in correspondence with a transition between two adjacent bits. Di (D0–D9) designates the ten successive transitions of the digital signal D, which respectively correspond to the ten sampling instants Si. Therefore, in the example illustrated, in which k=3 and the ascending edge of the clock signal C coincides with a transition of the digital signal D, the transitions Di precede the respective sampling instants Si by one-and-a-half periods R.

Sampling instants Si serve as a reference to the phasing. In the example illustrated, a phasing test takes place at an instant Pi which follows each sampling instant Si by a delay Y, such that $Pi=Si+Y$, with $Y=k'R/2$, in which k is a positive whole odd number other than 0 (k'=3, in the example chosen). If the phasing between the signals C and D is perfect, the transition Di+2 of the digital signal occurs at the instant Pi. It is assumed that this transition corresponds to an ascending edge. If the transition is trailing, i.e., lagging, at the instant Pi, the ascent has not yet taken place, so the result DPi of the phasing test will correspond to the lowest level and will indicate a logic value of 0, for example. On the contrary, if the transition is leading, the ascent has already taken place and the result DPi of the phasing test will have the logic value 1. The opposite is true if the edge is descending. On the other hand, the sampling at the instants Si+1 and Si+2 indicates whether or not an edge is present. The phasing test and the sampling indicate whether or not a transition is present, and reveal its direction in the digital signal D. In other words, if $Si+1 \oplus Si+2=0$, it is known that the signal does not incorporate an edge between its two sampling instants, so the phasing test is bypassed.

if $Si+1 \oplus Si+2=1$, an edge has been detected by the sampling. In this case, the phasing test will determine whether it is lagging or leading relative to the phasing test instants Pi. If the edge is ascending and if DPi=1, the edge is leading, and if DPi=0, the edge is lagging. Conversely, if the edge is descending, and if DPi=0, the edge is leading, and if DPi=1, the edge is lagging.

Figure 2:
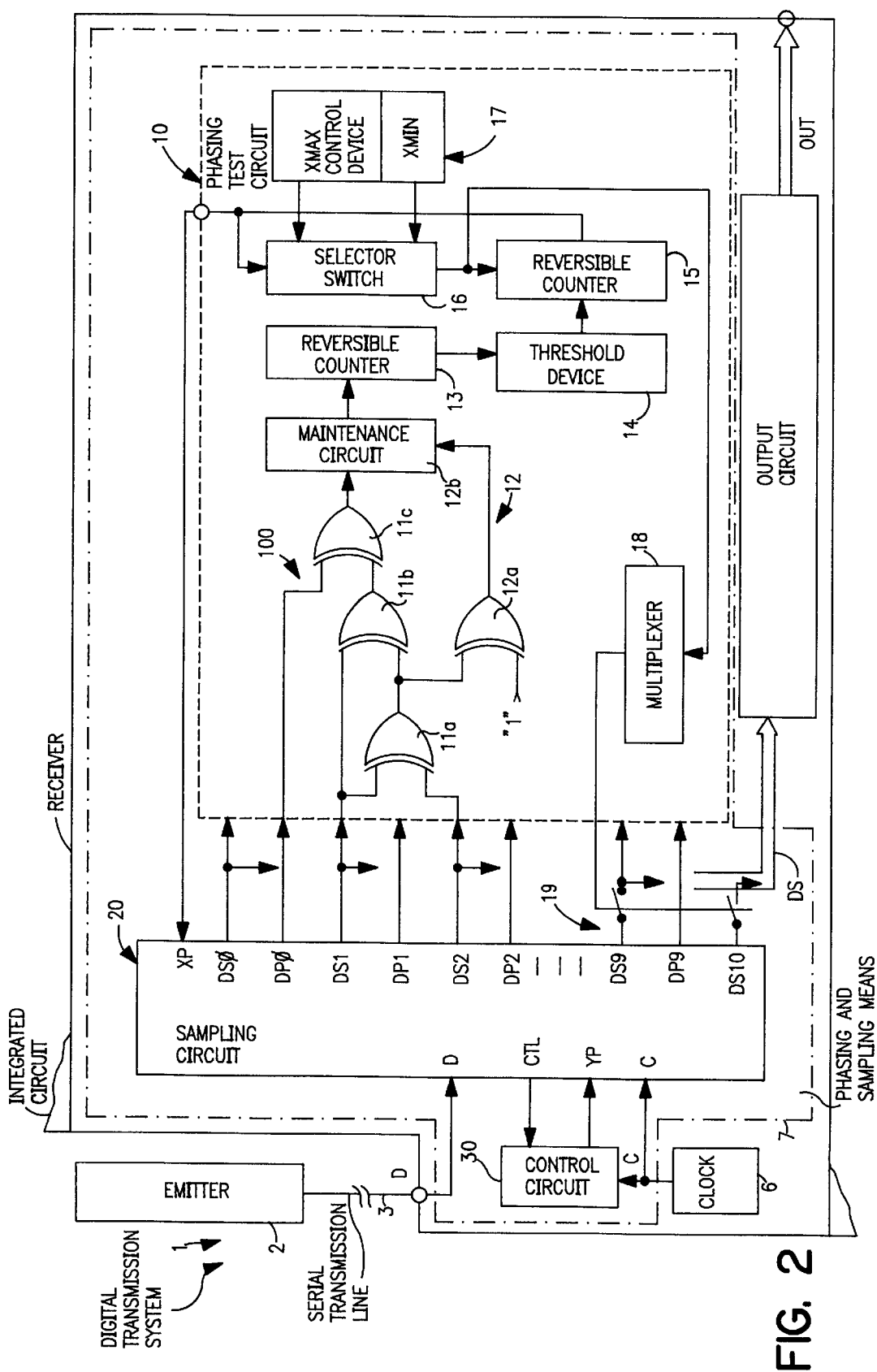
FIG. 2 illustrates, in the form of a partial block diagram, a serial digital transmission system, and in schematic form, a phasing test circuit incorporated in the receiver of a preferred form of a transmission system which implements the process represented in FIG. 1.

FIG. 2 illustrates, in a block diagram, form a serial digital transmission system 1 which includes an emitter 2 linked by means of a serial transmission line 3 to a receiver 4. The receiver 4 is incorporated in an integrated circuit 5 and it includes a clock 6 which generates the clock signal C, phasing and sampling means 7 which receive the clock signal C and the digital signal D, and an output circuit 8 which modifies the sampled digital signal so that the output signal OUT of the receiver corresponds to the digital signal applied to the emitter. An example of the embodiment of these means whose adaptation to the implementation of the invention will be evident to one skilled in the art who has read the present application, is found in the above-mentioned European patent application documents. The phasing and sampling means 7 include a phasing test circuit 10 and a sampling circuit 20 which implement the process just described in reference to FIG. 1.

Figure 3:
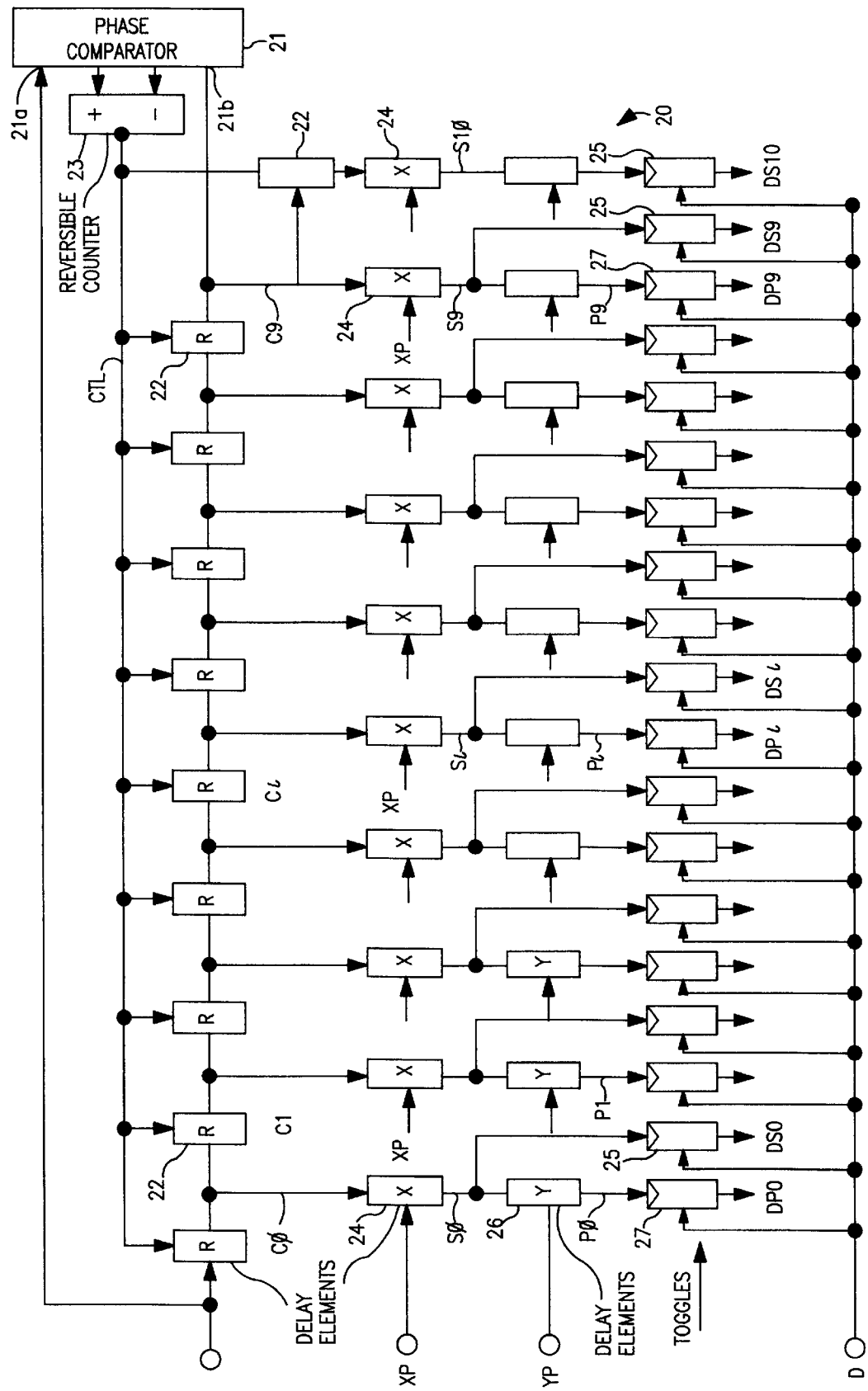
FIG. 3 illustrates an example of an embodiment of a sampling circuit which implements the process represented in FIG. 1.

FIG. 3 illustrates a first example of the sampling circuit 20 according to the invention, which is based on the structure used in the above-mentioned European patent documents so as to exploit all the advantages thereof. The circuit 20 is a phase locked circuit which includes: four inputs, for the clock signal C, the digital signal D, a control signal XP issuing from the phasing test circuit 10, and a control signal YP issuing from a circuit 30, respectively; a phase comparator 21 having a first input 21a which receives the clock signal directly, a second input 21b which receives the clock signal C through a first group of, cascade delay elements 22 which is a group of ten delay elements in the example illustrated, each of which is provided with a control terminal for adjusting the delay, and an output which furnishes a phase error signal which can be composed, for example, of two respective signals of incrementation (+) and decrementation (−) or of a single binary signal whose two states have the respective functions of incrementation and decrementation; and a digital control device such as a reversible counter 23 which has an input which receives the phase error signal from the phase comparator and which furnishes a digital control signal CTL to the respective control terminals of the delay elements 22. The ten output signals Ci (C0–C9) from the delay elements 22 are applied to the respective inputs of a second group of ten delay elements 24 whose respective delays are adjusted to the same value X by the control signal XP. In accordance with the precept of the above-mentioned European patent documents, the output signals Si (S0–S9) of the delay elements 24 are applied to the respective control terminals of ten sampling toggles 25 which sample the digital signal D at the instants Si in order to furnish the desired sampling signals DSi (DS0–DS9). The sampling signals DSi represent the logic values of ten successive bits of the signal D. The set DS of sampling signals DSi is applied to the input of the output circuit 8, as indicated in FIG. 2. According to the invention, the output signals Si (S0–S9) of the delay elements 24 are also applied at the respective inputs of a third group of ten delay elements 26 whose respective delays are adjusted to the same value Y by the control signal YP. The output signals Pi (P0–P9) of the delay elements 26 are applied to the respective control terminals of ten test toggles 27 which sample the digital signal D at the instants Pi in order to furnish the corresponding test samplings DPi (DP0–DP9).

Figure 4:
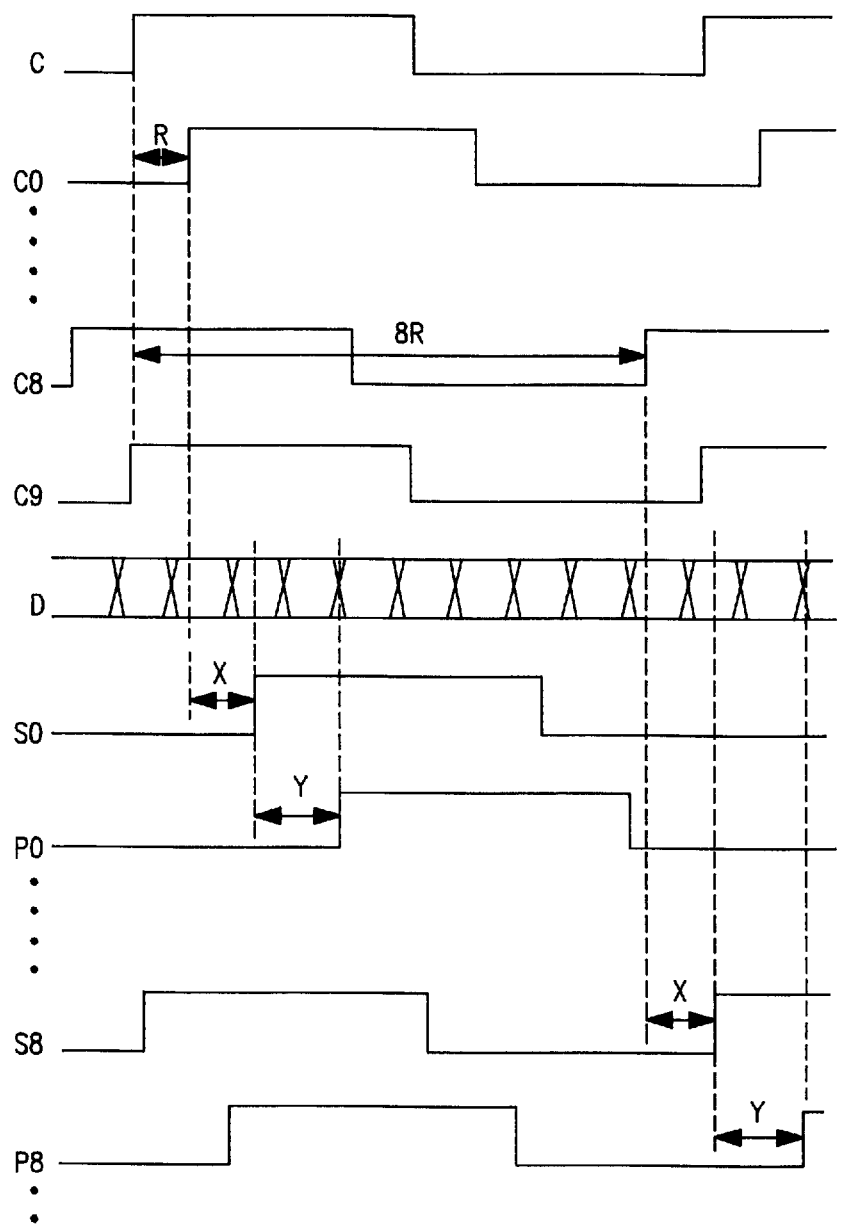
FIG. 4 is a timing diagram which serves to illustrate the operation of the sampling circuit represented in FIG. 3.

The operation of the sampling circuit 20 will now be described with reference to the timing diagrams in FIGS. 1 and 4. In accordance with the precept of the above-mentioned European patent documents, the delays Xi (X0–X9), which in FIG. 1 refer to the ascending edge of the clock signal C, are determined from ten auxiliary clock signals Ci (C0–C9) issuing from the clock signal C through the equal successive delays of the delay elements 22 (see FIG. 4). Under these conditions, the period T of the clock signal is divided into ten equal delays which, when the digital signal D is phased exactly with the clock signal C, correspond to the pulse repetition period R of the bits of the digital signal D, as indicated in FIGS. 3 and 4. Under these conditions, the control signal XP adjusts the delays X of the delay elements 24, so that the sum of the delay X and the delay of the auxiliary clock signal Ci corresponds to the delay Xi indicated in FIG. 1 (Xi=Ci+X) and determines the sampling instant Si. Consequently, if the digital signal D is phased and synchronized with the clock signal C as illustrated in FIG. 1, the delay X equals 3R/2. However, it will be noted in FIG. 4 that the ascending edges of the clock signal do not necessarily correspond to transitions of the digital signal D. Under these conditions, the delay X more or less deviates from this value. In the example represented in FIG. 4, the transitions of the digital signal D are leading the ascending edges of the clock signal C by the same value, since the phasing is hypothetically perfect. The sampling instants Si therefore occur with the same lead, due to a value of X which is lower than 3R/2. The duration 3R/2, then, is an average value of X.

On the other hand, the output signals Si which define the sampling instants Si are delayed by the respective delay elements 26 with the value Y=3R/2 so that they produce the signals Pi (FIG. 4) which define the phasing test instants Pi (FIG. 1). The samplings DPi and DSi obtained from the digital signal D at the respective instants Si and Pi are furnished as input signals to the phasing test circuit 10.

Figure 5:
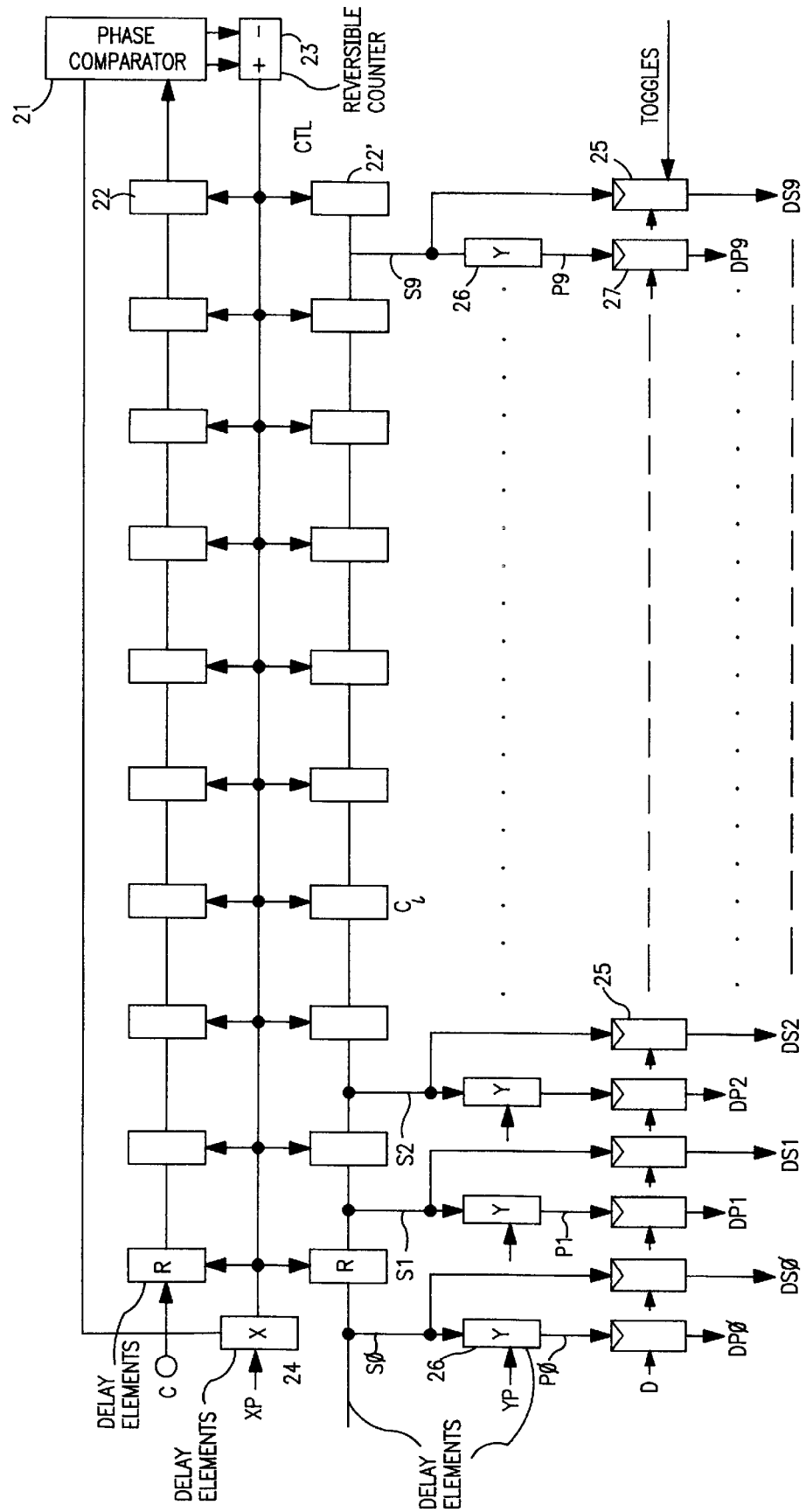
FIG. 5 illustrates a variant of the embodiment of the sampling circuit represented in FIG. 3.

FIG. 5 illustrates one of the possible variants of the sampling circuit 20. The common components of the circuits 20 are designated in FIGS. 3 and 5 by the same reference numbers. The group of delay elements 24, from FIG. 2 is reduced to a single element 24, and the group of delay elements 22 from FIG. 3 is split into two groups 22 and 22' which are serially connected by means of the element 24 and controlled by the output signal CTL of the reversible counter 23. The delay elements 22 are connected between the input terminal of the clock signal C and one input of the phase comparator 21, while the delay elements 22' furnish at their respective inputs the signals S0–S9 applied to the delay elements 26 and to the sampling toggles 25 and 27. The last element of the group 22' could be eliminated, but it constitutes a load analogous to the other elements and contributes to the obtainment of equal delays between the signals S0–S9.

FIG. 2 illustrates the structure of the phasing test circuit 10. As can be seen from the description above, the phasing test circuit 10 receives the sampling signals DS0–DS9 and DP0–DP9 as inputs. For purposes of convenience, the structure of the phasing test circuit 10 represented in FIG. 2 only shows the cell 100 which relates to the phasing test at the transition Pi with i=0. It is clear that the same cellular structure repeats itself for the other values of i with the reference 10*i*. According to the example illustrated, each cell 10*i* of the circuit 10 includes three exclusive OR logic gates (XOR gates) 11*a*, 11*b* and 11*c* with two inputs each. In accordance with the description of the process of the invention given in reference to FIG. 1, the gate 11*a* receives the bit samplings DSi+1 and DSi+2 (DS1 and DS2 in the cell 100) and verifies the value of Si+1⊕Si+2. The second gate 11*b* receives the sampling DSi+1 (DS1) and the result furnished by the gate 11*a*, in order to verify whether the edge is ascending or descending. The third gate 11*c* receives the phasing test sampling DPi (here DP0) and the signal furnished by the gate 11*b*, in order to verify whether the edge is leading or lagging. If at the sampling, DSi+1 has the logic value 0, which represents a low level (Si+1=0), and if DSi+2 has the same value, no edge is detected. If DSi+2=1, an edge is detected, and the output of the gate 11*b* has the value 1, which indicates a leading edge. If DPi=0, the gate 11*c* l outputs the value 1, which indicates an edge lag, and if DPi=1, it outputs the value 0, which indicates a phase lead. Conversely, if DSi+1=1, no edge is detected when DSi+2=1, and a descending edge is detected when DSi+2=0, in which case the gate 11*a* furnishes the value 1 and the gate 11*b* furnishes the value 0. The gate 11*c* furnishes the value 1 if DPi=1, which indicates a phase lag, and furnishes the value 0 if DPi=0, indicating a phase lead. Consequently, when an edge is detected, the output of the gate 11*a* has the value 1, and the output of the gate 11*c* has the value 1 to indicate a phase lag and the value 0 to indicate a phase lead.

The circuit 10 includes a device 12 which makes it possible to select only the condition Si+1⊕Si+2=1. In the example illustrated, the selection device 12 includes an XOR gate 12*a* having one input connected to the output of the gate 11*a* and a second input which receives the logic value 1, and a maintenance circuit (a toggle, for example) 12*b* having a control terminal connected to the output of the gate 12*a*, an input connected to the output of the gate 11*c*, and one output. If an edge is detected by the gate 11*a*, the output of the gate 12*a* has the value 0 and it commands the maintenance circuit 12*b* to furnish an output which is equal or inverse to its input. On the contrary, if an edge is not detected, the output of the gate 12*a* has the logic value 1 and it commands the maintenance circuit 12*b* to retain the input value at its output. Under these conditions, the output of the maintenance circuit 12*b* only represents a phase lead or lag when a transition is detected.

The result furnished by all the toggles 12*b* of the cells 10*i* in the circuit 10 can serve as a control signal XP for adjusting the delays X in FIG. 3 or Xi in FIG. 1. The detection of a phase lead increases the delay Xi and a phase lag decreases the delay. However, the circuit 10 in the example illustrated can only detect one phase lead and one phase lag, so a perfect phasing translates into a succession of alternate leads and lags. Consequently, direct adjustment of the delays X would translate into an oscillating state of the circuit 10 and would produce an instability of the adjustment loop. In order to avoid this state, the adjustment of the delays X is actuated after a time delay of the results furnished by the toggle 12*b*. In the example illustrated, this time delay is produced by a count of the 1 and 0 bits obtained at the output of the toggle 12*b* during a predetermined length of time, 4T for example. The circuit 10 therefore includes a reversible counter 13 connected to the output of the toggle 12*b*, for example, for adding the 1 bits and subtracting the 0 bits during 4 periods T of the clock signal C, and for furnishing the sampling control signal XP to the sampling circuit 20 in order to adjust the delays X. Incidentally but advantageously, the output of the reversible counter 13 is connected to a threshold device 14 which is provided for triggering a second reversible counter 15, in such a way that the phasing is only activated if the result of the count exceeds a predetermined value.

Figure 6:
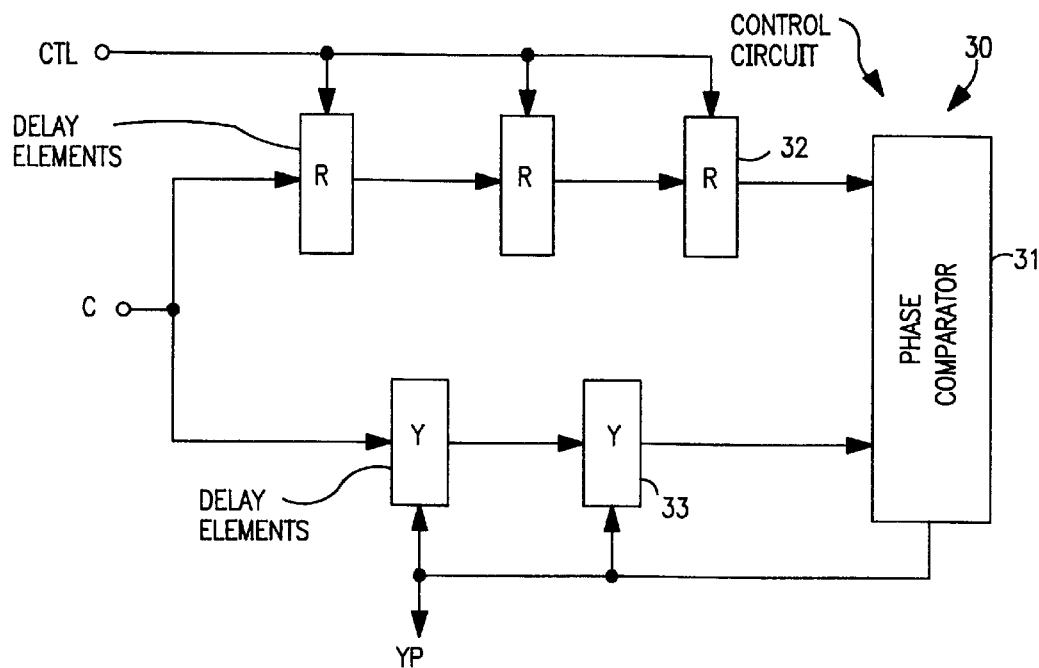
FIG. 6 illustrates a phase lag control circuit.

FIG. 6 illustrates an example of the generation of the control signal YP for the delays Y in the sampling circuit 20. The control signal YP is produced by a control circuit 30 represented in block form in FIG. 2, and in schematic form in FIG. 6. The control circuit 30 includes: an input terminal for the clock signal C and an input terminal for the control signal CTL produced by the reversible counter 23 in the sampling circuit 20; a phase comparator 31 with two inputs; a first branch made from an odd number 2l+1 of delay elements 32, three in the example illustrated, each of which produces a delay of the bit period R, and which are controlled by the signal CTL and cascaded between the input terminal of the clock signal C and one input of the phase comparator 31; and a second branch made from an even number 2m of delay elements 33, two in the example illustrated, each of which produces a delay Y, which are cascaded between the input terminal of the clock signal C and the other input of the phase comparator 31, which are controlled by the output of the phase comparator, and which furnish the adjusting signal YP. Thus, the delay Y is adjusted so that the two branches have the same delay. Therefore $(2l+1)R=2m\ Y$, and hence $Y=[(2l+1)/2m]\ R$, of the desired type, $Y=R/2+nR=k'R/2$ in which k' is a positive whole odd number, as indicated above in reference to FIG. 1. In the example chosen, k'=3.

Therefore, the instant invention offers the advantage of being able to make the phasing and the sampling respond to one another. The resulting adjustment is therefore much more efficient than that which could be obtained from the prior art and it makes it possible, at the same throughput, to tolerate greater margins of clock precision between emitters and receivers. For example, with a throughput of 1 gigabaud (R=1 nanosecond), a delay increase in increments of 50 picoseconds and a time delay of 4T (40 nanoseconds), the system can compensate for clock frequency variations of 50 ps (picoseconds) every 40 ns (nanoseconds), that is, variations on the order of $10^{-3}$, which are approximately a thousand times greater than those which could be compensated for in the prior art. Under these conditions, at an equal throughput, the system is not as subject to the effects of technological dispersions and operational drifts. This also indicates that the process of the invention is well suited to higher throughputs without being subject to constraints in clock precision. Moreover, while the invention can be applied in very diverse transmission systems, it is particularly well adapted to the system described in the above-mentioned documents.

Nevertheless, the delay X has a limited range of variation, in order to assure efficient and reliable sampling. In reference to FIG. 4, in which hypothetically the digital signal D is perfectly phased with the clock signal C, it can be seen that the delays X are all equal and that their value depends on the lead or the lag between the two signals C and D. In the example in FIG. 4, the value X is less than 3R/2, in order to account for the phase lead of the signal D. However, if, for example, the digital signal D has a succession of periods which are equal to $R-\Delta R$, that is, slightly shorter by the same value $\Delta R$ than the period R furnished by the auxiliary clock signals C0–C9 of the clock signal C, the lead that the signal D has over the signal C in FIG. 4 will progressively increase in such a way that the values of X in each period T of the clock signal will decrease to reach a predetermined minimum value Xmin, which depends on numerous factors, particularly technological factors. Theoretically, Xmin can have a value of nil, but producing very short adjustable delays poses numerous problems which cause the average chosen value of X to be 3R/2 rather than R/2 if the frequency of the signal D is very high, for example on the order of one gigahertz. If X becomes negative, this indicates that the clock is too slow and that a bit of the digital signal D cannot be sampled. Conversely, a progressive increase in the period R would increase the value of X to a theoretical value of 5R/2, beyond which the sampling circuit 20 would read the same bit twice. Therefore, it is not possible to compensate for too great a variation of the phasing with the circuit which has been described above. The invention also offers the advantage of compensating for the extraperiodic drifts between the two signals D and C. The compensation consists of adding or subtracting a pulse repetition period R by which the clock is too fast or two slow relative to the pulse repetition period of the bits of the digital signal D, so that the variation in the value of X remains within one pulse repetition period R while allowing the detection and the correct reconstruction of all the bits of the digital signal D. According to the example illustrated in FIG. 2, the compensation means include, in the phasing test circuit 10, a period selector switch 16 which receives the adjusting signal XP and furnishes a control signal to an input of the second reversible counter 15. The selector switch 16 receives, from a control device 17, two signals which represent the respective values Xmin and Xmax=Xmin+R.

Figure 7:
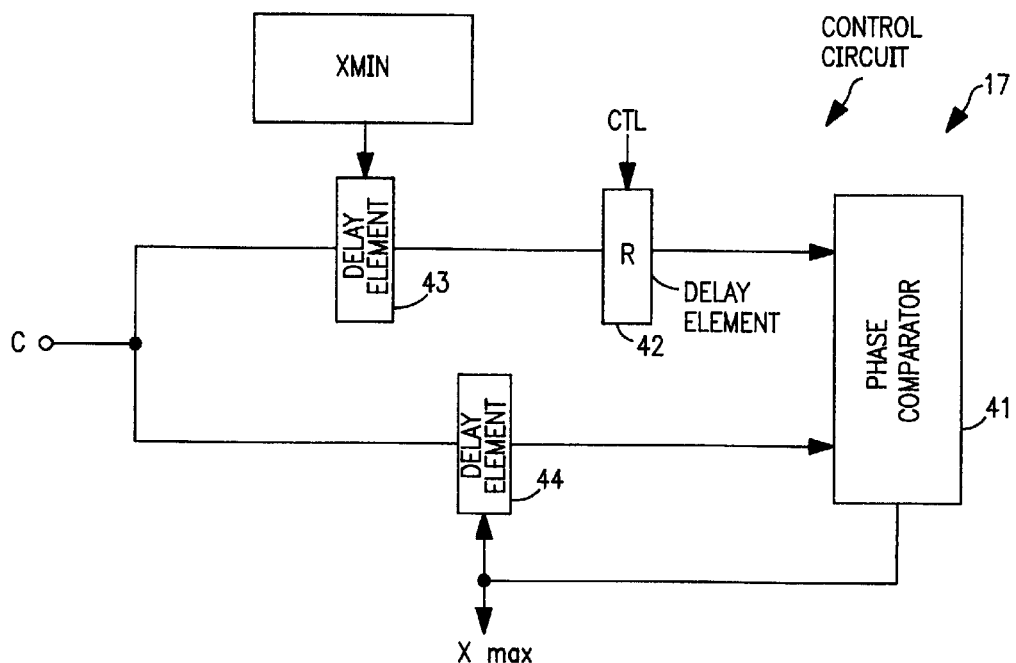
FIG. 7 illustrates a circuit for determining the limiting values of the phasing in accordance with the instant invention.

FIG. 7 represents an example of the embodiment of the control circuit 17 which includes: two input terminals for the clock signal C and the control signal CTL which issue from the sampling circuit 20; a block which furnishes a signal representing the minimal value Xmin of X; and a phase comparator 41 with two inputs linked by two respective branches of the clock signal C, a first branch which includes a delay element 42 which represents the period R, and is consequently controlled by the signal CTL, and a delay element 43 which produces a delay having the value Xmin furnished to it, and a second branch which includes only one delay element 44 controlled by the phase error signal output by the phase comparator 41. Thus, the balance of the two branches leads the delay element 44 to have the value Xmax. It is clear that the value Xmax could be chosen as a reference, so that the control circuit 17 would then furnish the value Xmin.

Consequently, if the adjusting signal XP is led to assume a value lower than Xmin or to exceed the value Xmax, the period selector switch 16 executes a shift, of one pulse repetition period R of the bits, leading or lagging in phase if the delay XP becomes, respectively, lower than Xmin or higher than Xmax. In other words, if XP falls below Xmin, the selector switch 17 renders XP=Xmax, and conversely, if XP exceeds Xmax, the selector switch 17 renders XP=Xmin. However, it has been seen previously that when X becomes lower than Xmin, the shift by one period R corresponds to sampling the same bit of the digital signal D twice if the clock C is too slow and is phased with the preceding bit, so that eleven bit samplings instead of ten will be furnished in the period T of the clock signal C, and that when X exceeds Xmax, it corresponds to omitting one bit sampling if the clock is too fast and must skip one period R of a bit of the signal D in order to phase itself with the next bit, so that only nine bit samplings will be furnished in the period T. This is clearly evident from the timing diagram in FIG. 8.

Figure 8:
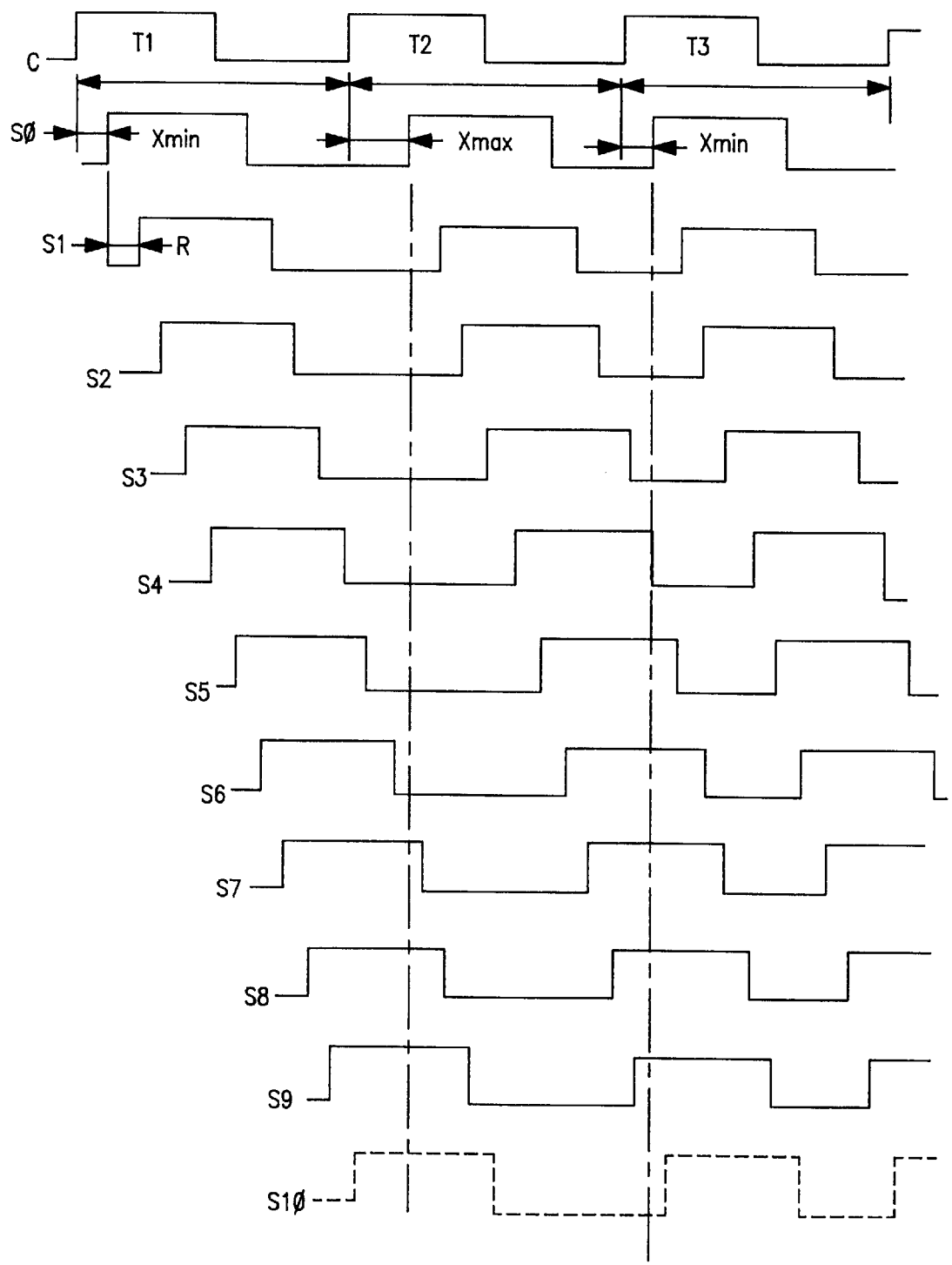
FIG. 8 shows a timing diagram of a sampling which illustrates one possible feature of the invention.

FIG. 8 is a timing diagram which illustrates the clock signal C and the ten sampling signals Si (S0–S9) from FIG. 4. For purposes of convenience, this example assumes the extreme case, in which the delay XP is equal to Xmin in the period T1, to Xmax=Xmin+R in the second period T2, and again to Xmin in the third period T3. From this timing diagram, it appears that between the first two ascending fronts of the signal S0, when the delay goes from Xmin to Xmax, it misses a sampling signal between the signal S9 and the next front of the signal S0. According to the invention, a signal S10 is added, represented in FIG. 8 by a broken line, which is delayed relative to the signal S9 by the period R. In the next period T following the delay, when XP goes from Xmax to Xmin, it is evident that the ascending front of the signal S9 is synchronous with the next ascending front S0 which follows in the period T3. The same bit of the signal D will then be sampled by these two signals S9 and S0. An example of an embodiment of the invention is given in FIGS. 2 and 3. In FIG. 3, the additional sampling signal S10 is obtained, like the signals Si, from an additional delay element 22 which receives the signal C9 and is controlled by the signal CTL, and from a second delay element 24 which receives the output signal from the first delay element 22 and is controlled by the signal SP. The signal S10 output by the element 24 controls an additional sampling toggle 25 which receives the signal D and furnishes the sampling DS10. In FIG. 2, the output signal of the selector switch 16 is also applied to a multiplexer 18. The function of the multiplexer 18 is symbolized by the switch 19 indicated in FIG. 2. The switch 19 makes it possible to disconnect the signal S9 or to add the signal S10.

As far as the output circuit 8 of the receiver 4 in FIG. 2 is concerned, the delimitation of the words in order to reconstruct the data signal emitted does not pose any particular problem. In the above-mentioned documents, the words are separated from one another by a synchronization transition and a clock transition which serve to delimit them. In the present case, and in a conventional way, there are no transitions serving as synchronizations or clocks, and the data are sampled in a random order, for example in the toggles of the deserializer described in the above-mentioned documents. The standard codes define a sequence for reconstructing the words, ordinarily a string of bits which can never be found in a normal transmission, that the emitter sends cyclically. By recognizing this sequence, the receiver (the deserializer in the present example) determines the position of the words in the serially received data and counts the bits in order to form the words. Various techniques exist for implementing this conventional process for the reconstruction of words, particularly, the "sliding" register, the crossbar, etc.

In summary, the process which has just been described has the fundamental characteristic of referring to the sampling instants Si in order to carry out the phasing. The currently preferred form of the invention for carrying out this phasing consists of determining phasing test instants Pi which refer to the sampling instants Si to verify whether transitions of the digital signal are leading or lagging in phase relative to the phasing test instants Si. However, this form is not necessary, since other forms can omit the determination of phasing test instants, for example by producing a reference signal which refers to sampling instants and comparing this signal with the digital signal D. In the example illustrated, the determination of the phasing test instants is achieved by adding to each sampling instant Si a complementary delay Y=kR/2, in which k is a positive whole odd number other than zero and R designates the pulse repetition period of the bits of the digital signal D. This relation assumes that the sampling is carried out in a conventional way at an instant which corresponds to one half-period R. It could obviously be carried out at an instant which corresponds to another relationship. In fact, just as the phasing and the sampling refer to one another, the phasing test which is conducted in the example illustrated is a sampling test which is used for the phasing. It is understood that the sampling is a form of implementation chosen as an example, and that other forms are possible. It has also been seen that in the example chosen the signals Si are obtained from auxiliary clock signals Ci, and it is understood that other forms of obtainment are possible. In the process described, the phasing test consists of detecting the presence and the direction of a transition of the digital signal and of verifying whether the value of the digital signal analyzed at the test instant corresponds to a phase lead or a phase lag relative to the transition detected. Numerous variants are within reach of one skilled in the art. For example, instead of applaying the invention to all the transitions, only some of them may be chosen, for example, the ascending transitions and/or one transition in four. However, according to other possible forms for determining the phasing instants, such as that which involves a reference signal, the phasing test can be independent of the direction. On the other hand, it is possible to take into account only the phase leads or lags, and in this case the time delay can be produced in reference to the total number of transitions selected, for example, instead of actuating the phasing after an analysis of a number of phasing tests. In the example illustrated, this analysis is carried out during a predetermined number (four) of consecutive periods T of the clock signal. It has been seen that this number determines the precision of the clocks to be used in the transmission system 1. But this precision can also be determined by the other possible variants of the invention. Finally, it has been seen that when it is desirable to extend the adaptation of the system to a wide range of variation of the digital signal relative to the clock signal, the process consists of assigning limit values to the delays X of the sampling instants and, when these limit values are exceeded, of shifting the sampling of the digital signal by one pulse repetition period R of the bits of this signal, and of compensating for the shift in order to reconstruct all the bits of the digital signal. In the example described, the compensation is carried out by the selective addition of an additional sampling signal S10 or by the selective elimination of the first or last sampling signal S0 or S9. Of course, other modes of implementation are possible.

It has been seen that the mode of implementation illustrated relates to the technology described in the above-mentioned European patent documents. However, it is clear that the characteristics of the process according to the invention are not linked to one particular mode of implementation. Therefore, a corollary subject of the invention is a serial digital transmission system 1 which includes an emitter 2 linked through a link 3 for transmitting a serial digital signal D to a receiver 4 which refers to an internal clock 6 which delivers a clock signal C and phasing and sampling means 7 which implement the process of the invention described above. The internal clock can be outside the receiver. In the example illustrated, based on the technology of the above-mentioned European patent documents, the phasing and sampling means 7 include a phasing test circuit 10, in which the gates 11a and 11b and the selection device 12 form means for detecting a transition of the digital signal D, the sampling circuit 20 forms means which receive the clock signal C for the generation of a predetermined phasing test instant, the gate 11c forms phase comparison means connected to the detection means 11a, 11b, 12 and the generation means 20 for determining the phase deviation between the phasing test instant Pi and the transition, and the reversible counter 13 and the threshold device 14 connected to the output of the comparison means 11c form means for controlling the generation means 20 in such a way as to lead to a phasing between the digital signal D and the clock signal C. Of course, other forms of embodiment of all these means are possible and are within reach of one skilled in the art. Among other things, it has been seen above that the detection of a transition can be accompanied by a detection of the direction of the transition.

Referring to FIG. 3, it can generally be said that the generation means 20 comprises a phase locked loop circuit composed of a phase comparator 21 with two inputs which respectively receive the direct clock signal and the clock signal delayed by a first group of cascaded delay elements 22, which represent the pulse repetition period R of the bits of the digital signal D, a second group of delay elements 24, which represent the delays X of the sampling instants and a third group of delay elements 26, which represent the delays Y of the phasing instants, the respective delay elements in the first, second and third groups being serially connected.

According to the variant represented in FIG. 5, the generation means 20 comprises a phase locked loop circuit composed of a phase comparator 21 with two inputs which respectively receive the direct clock signal and the clock signal delayed by a first group of cascaded delay elements 22, which represent the pulse repetition period R of the bits of the digital signal D, an additional delay element 24 which represents the delay X of the sampling instants, which receives the clock signal and which is serially connected to a second group of cascaded delay elements 22' which represent the pulse repetition period R of the bits of the digital signal D, and a third group of delay elements 26, which represent the delays Y of the phasing instants and which are connected to the respective outputs of the additional delay element and of the delay elements in the second group.

It has also been seen in reference to FIGS. 6 and 7 that the phasing and sampling means 7 also include means for determining limit values for the delay of the sampling instants, means for shifting the sampling instants by one period R if the delay of the sampling instants reaches one of the limit values, and means for compensating for the shift in order to reconstruct all the bits. The compensation includes the addition of one sampling signal. The elimination of a sampling signal is not necessary, since a double sampling could occur and could be taken into account for the correct reconstruction of the output signal.

The subject of the invention also provides an integrated circuit 5 which incorporates a receiver 4 of a serial digital signal D, the receiver including means for the phasing and sampling 7 of the digital signal which implement the process defined previously and/or are embodied as indicated in reference to the transmission system.

While the preferred forms and embodiments of the instant invention have been illustrated and described, it will be apparent to those of ordinary skill in the art that various changes and modifications may be made without deviating from the inventive concepts and spirit of the invention as set forth above, and it is intended by the appended claims to define all such concepts which come within the full scope and true spirit of the invention.

We claim:

1. A process for sampling a serial digital signal (D) representative of recurring bits and having transitions, comprising the steps of phasing the digital signal with a clock signal (C) and sampling the digital signal at sampling instants (Si) delayed from said clock signal to have samples (DSi) representative of bits of the digital signal, said phasing step including determining phasing test instants (Pi) delayed from said sampling instants to substantially occur at respective possible transitions of the digital signal and comparing said phasing test instants with respective transition occurrences in the digital signal to determine a phase deviation therebetween, and said sampling step including controlling said sampling instants to be delayed from said clock signal in accordance with said phase deviation.

2. The process according to claim 1, wherein said step of comparing said phasing test instants with the respective transition occurrences in the digital signal includes getting phasing samples (DPi) at said phasing test instants and detecting said transition occurrences.

3. The process according to claim 2, wherein each of said transitions of the serial digital signal has a direction and said comparing step further includes determining the direction of said detected transitions.

4. The process according to claim 1, wherein said controlling step is performed after a predetermined number of said comparing steps.

5. The process according to claim 4, wherein said clock signal has recurring periods (T) and the predetermined number of said comparing steps corresponds to a predetermined number of said consecutive recurring periods of the clock signal.

6. The process according to claim 1, wherein said sampling instants are delayed from said clock signal by a delay $X_i = kR/2 + iR$, where k is a positive whole odd number other than 0, i is 0 and/or a positive whole number and R designates a period of said recurring bits in said digital signal.

7. The process according to claim 6, wherein said phasing test instants are delayed from said sampling instants by a complementary delay $Y = k'R/2$, wherein k' is a positive whole odd number other than 0.

8. The process according to claim 7, further including performing a phasing test by detecting a transition of said digital signal and verifying whether a value of the digital signal at one of said phasing test instants corresponds to a phase lead or a phase lag relative to said transition.

9. The process of claim 6, wherein said clock signal has transitions and a period (T) which corresponds to a maximal number representative of said number i of recurring bits in said digital signal, and said sampling instants are delayed from predetermined transitions of said clock signal.

10. The process according to claim 1, wherein said phasing step further includes controlling the phasing test instants in accordance with said phase deviation.

11. A process for sampling a serial digital signal (D) representative of recurring bits and having transitions, comprising the steps of phasing the digital signal with a clock signal (C) and sampling the digital signal at sampling instants (Si) delayed from said clock signal to have samples (DSi) representative of bits of the digital signal, said phasing step including determining phasing test instants (Pi) delayed from said sampling instants to substantially occur at respective possible transitions of the digital signal and comparing said phasing test instants with respective transition occurrences in the digital signal to determine a phase deviation therebetween, and said sampling step including controlling said sampling instants to be delayed from said clock signal in accordance with said phase deviation and further comprising assigning limit values to delays (Xi) of the delayed sampling instants and, when said limit values are reached, shifting said delayed sampling instants (Si) by one pulse repetition period R of bits of said digital signal, and compensating for said shifting so as to reconstruct all said bits of said digital signal.

12. A transmission system (1) comprising an emitter (2) for transmitting a serial digital signal (D) representative of bits recurring at a period (R) and having transitions and a receiver (4) for receiving said serial digital signal, said receiver having an internal clock (5) which generates a clock signal (C), means (10) for phasing said digital signal with said clock signal, and means (20) for sampling said digital signal at sampling instants (Si) delayed from said clock signal to have samples (DSi) representative of bits of said digital signal, said phasing means including means for determining phasing test instants (Pi) delayed from said sampling instants to substantially occur at respective possible transitions of the digital signal and means connected to said determining means for comparing said phasing test instants with respective transition occurrences in the digital signal to determine a phase deviation therebetween, and said sampling means including means connected to said phase comparison means for controlling said sampling instants to be delayed from said clock signal in accordance with said phase deviation.

13. The transmission system according to claim 12, wherein said means for phasing and sampling includes a phase locked loop circuit having a phase comparator (21) with first and second inputs and an output, said first input (21a) receiving the clock signal directly and said second output supplying a phasing signal, digital control means (23) connected to said output of said comparator for generating a digital control signal (CTL), a first group of cascaded controllable delay elements (22), which first group of controllable delay elements has an input for receiving the clock signal and an output connected to said second input (21b) of said phase comparator, each of said controllable delay elements being controlled by said digital control signal to have a delay representative of said recurring period (R) of bits of said digital signal, a second group of controllable delay elements (24) which are controlled to have respective outputs representative of the sampling instants (Si) and a third group of controllable delay elements (26) which are controlled to have respective outputs representative of the phasing instants (Pi), the delay elements of the first, second and third groups being serially connected, respectively.

14. The transmission system according to claim 13, wherein said phasing test instants are controlled in accordance with said phase deviation.

15. The transmission system according to claim 12, wherein said means for phasing and sampling includes a phase locked loop circuit having a phase comparator (21) with first and second inputs and an output, said first input (21a) receiving the clock signal directly and said second output supplying a phasing signal, digital control means (23) connected to said output of said comparator for generating a digital control signal (CTL), a first group of cascaded controllable delay elements (22), which first group of controllable delay elements has an input for receiving the clock signal and an output connected to said second input (21b) of said phase comparator, each of said controllable delay elements being controlled by said digital control signal to have a delay representative of said recurring period (R) of bits of said digital signal, an additional controllable delay element (24) which is controlled to have a delay (X) representative of the shorter of the sampling instants, which additional delay element receives the clock signal and is serially connected to a second group of cascaded controllable delay elements (22') which are controlled by said digital control signal to have a delay representative of said recurring period of said bits of said digital signal and to have respective outputs representative of the sampling instants (Si), and a third group of controllable delay elements (26) which are controlled to have respective outputs representative of the phasing instants (Pi) and are connected to respective outputs of the additional delay element and the delay elements of said second group.

16. The transmission system according to claim 15, wherein said phasing test instants are controlled in accordance with said phase deviation.

17. The transmission system according to claim 12, wherein said means for sampling includes means for determining limit values for a delay of said delayed sampling instants, means for shifting the delayed sampling instants when the delay of the delayed sampling instants reaches one of said limit values, and means for compensating for the shifting of the delayed sampling instants in order to reconstruct all bits of the digital signal.

18. The transmission system according to claim 12, wherein said phasing means further includes means (30) for controlling said phasing test instants in accordance with said phase deviation.

19. An integrated circuit comprising a receiver of a serial digital signal (D) representative of bits recurring at a period (R) and having transitions, said receiver having an internal clock (5) which generates a clock signal (C), means (10) for phasing said digital signal with said clock signal and means (20) for sampling said digital signal at sampling instants (Si) delayed from said clock signal to have samples (DSi) representative of bits of said digital signal, said phasing means including means for determining phasing test instants (Pi) delayed from said sampling instants to substantially occur at respective possible transitions of the digital signal, and said sampling means including means connected to said determining means for comparing said phasing test instants with respective transition occurrences in the digital signal and determining a phase deviation therebetween and means connected to said phase comparison means for controlling said sampling instants to be delayed from said clock signal in accordance with said phase deviation.

20. The integrated circuit according to claim 19, wherein said means for phasing and sampling includes a phase locked loop circuit having a phase comparator (21) with first and second inputs and an output, said first input (21a) receiving the clock signal directly and said second output supplying a phasing signal, digital control means (23) connected to said output of said comparator for generating a digital control signal (CTL), a first group of cascaded controllable delay elements (22), which first group of controllable delay elements has an input for receiving the clock signal and an output connected to said second input (21b) of said phase comparator, each of said controllable delay elements being controlled by said digital control signal to have a delay representative of said recurring period (R) of bits of said digital signal, a second group of controllable delay elements (24) which are controlled to have respective outputs representative of the sampling instants (Si) and a third group of controllable delay elements (26) which are controlled to have respective outputs representative of the phasing instants (Pi), the delay elements of the first, second and third groups being serially connected, respectively.

21. The integrated circuit according to claim 19, wherein said means for phasing and sampling includes a phase locked loop circuit having a phase comparator (21) with first and second inputs and an output, said first input (21a) receiving the clock signal directly and said second output supplying a phasing signal, digital control means (23) connected to said output of said comparator for generating a digital control signal (CTL), a first group of cascaded controllable delay elements (22), which first group of controllable delay elements has an input for receiving the clock signal and an output connected to said second input (21b) of said phase comparator, each of said controllable delay elements being controlled by said digital control signal to have a delay representative of said recurring period (R) of bits of said digital signal, an additional controllable delay element (24) which is controlled to have a delay (X) representative of the shorter of the sampling instants, which additional delay element receives the clock signal and is serially connected to a second group of cascaded controllable delay elements (22') which are controlled by said digital control signal to have a delay representative of said recurring period of said bits of said digital signal and to have respective outputs representative of the sampling instants (Si), and a third group of controllable delay elements (26) which are controlled to have respective outputs representative of the phasing instants (Pi) and are connected to respective outputs of the additional delay element and the delay elements of said second group.

22. The integrated circuit according to claim 21, wherein said phasing test instants are controlled in accordance with said phase deviation.

23. The integrated circuit according to claim 19, wherein said means for sampling includes means for determining limit values for a delay of said delayed sampling instants, means for shifting the delayed sampling instants when the delay of the delayed sampling instants reaches one of said limit values, and means for compensating for the shifting of the delayed sampling instants in order to reconstruct all bits of the digital signal.

24. The integrated circuit according to claim 23, wherein said phasing test instants are controlled in accordance with said phase deviation.

25. The integrated circuit according to claim 19, wherein said phasing means further includes means (30) for controlling said phasing test instants in accordance with said phase deviation.

26. A process for sampling a serial digital signal (D) representative of recurring bits and having transitions, comprising the steps of phasing the digital signal with a clock signal (C) and sampling the digital signal at sampling instants (Si) delayed from said clock signal to have samples (DSi) representative of bits of the digital signal, said phasing step including determining phasing test instants (Pi) delayed from said sampling instants to substantially occur at respective possible transitions of the digital signal and comparing said phasing test instants with respective transition occurrences in the digital signal to determine a phase deviation therebetween, and said sampling step including controlling said sampling instants to be delayed from said clock signal in accordance with said phase deviation and wherein said phasing test instants are delayed from said sampling instants by a complementary delay Y=k'R/2, wherein k' is a positive whole odd number other than 0 and R is said period of the recurring bits in said digital signal (D).

27. A process for sampling a serial digital signal (D) representative of recurring bits and having transitions, comprising the steps of phasing the digital signal with a clock signal (C) and sampling the digital signal at sampling instants (Si) delayed from said clock signal to have samples (DSi) representative of bits of the digital signal, said phasing step including determining phasing test instants (Pi) delayed from said sampling instants to substantially occur at respective possible transitions of the digital signal and comparing said phasing test instants with respective transition occurrences in the digital signal to determine a phase deviation therebetween, and said sampling step including controlling said sampling instants to be delayed from said clock signal in accordance with said phase deviation and wherein said step of determining said phasing test instants includes generating a reference signal referring to said sampling instants and said comparing step includes comparing said reference signal with said digital signal.

28. A process for sampling a serial digital signal (D) representative of bits recurring at a period (R), comprising the steps of phasing the digital signal with a clock signal (C) having a period (T) which corresponds to a number of periods of the recurring bits in the digital signal, and sampling the digital signal at sampling instants (Si) to have samples (DSi) representative of the bits of the digital signal, said sampling instants being delayed from said clock signal by a delay Xi=kR/2+iR, where k is a positive whole odd number other than 0 and i is 0 and/or a positive whole number having a maximal value corresponding to said number of bit periods in said clock period less one, said phasing step including determining phasing test instants (Pi) to substantially occur at respective possible transitions of the digital signal, said phasing test instants being delayed from said sampling instants by a complementary delay Y=k'R/2, where k' is a positive whole odd number other than 0, and comparing said phasing test instants with respective transition occurrences in the digital signal to determine a phase deviation therebetween, and said sampling step including controlling said sampling instants to be delayed in accordance with said phase deviation.

29. The process according to claim 28, wherein said phasing step further includes controlling the phasing test instants in accordance with said phase deviation.

30. The process according to claim 28, further comprising assigning limit values to delays (Xi) of the delayed sampling instants and, when said limit values are reached, shifting said delayed sampling instants and, when said limit values are reached, shifting said delayed sampling instants (Si) by one pulse repetition period R of bits of said digital signal, and compensating for said shifting so as to reconstruct all said bits of said digital signal.

31. A transmission system (1) comprising an emitter (2) for transmitting a serial digital signal (D) representative of bits recurring at a period (R) and having transitions and a receiver (4) for receiving said serial digital signal, said receiver having an internal clock signal (C) having a period (T) which corresponds to a number of periods of the recurring bits in the digital signal, means (10) for phasing said digital signal with said clock signal and means (20) for sampling said digital signal at sampling instants (Si) to have samples (DSi) representative of the bits of the digital signal, said sampling instants being delayed from said clock signal by a delay Xi=kR/2+iR, where k is a positive whole odd number other than 0 and i is 0 and/or a positive whole number having a maximal value corresponding to said number of bit periods in said clock period less one, said phasing step including means for determining phasing test instants (Pi) to substantially occur at respective possible transitions of the digital signal, said phasing test instants being delayed from said sampling instants by a complementary delay Y=k'R/2, where k' is a positive whole odd number other than 0, and means connected to said determining means for comparing said phasing test instants with respective transition occurrences in the digital signal to determine a phase deviation therebetween, and said sampling means including means connected to said phase comparison means for controlling said sampling instants to be delayed from said clock signal in accordance with said phase deviation.

32. The transmission system according to claim 31, wherein said means for phasing and sampling includes a phase locked loop circuit having a phase comparator (21) with first and second inputs and an output, said first input (21a) receiving the clock signal directly and said second output supplying a phasing signal, digital control means (23) connected to said output of said comparator for generating a digital control signal (CTL), a first group of cascaded controllable delay elements (22), which first group of controllable delay elements has an input for receiving the clock signal and an output connected to said second input (21b) of said phase comparator, each of said controllable delay elements being controlled by said digital control signal to have a delay representative of said recurring period (R) of bits of said digital signal, a second group of controllable delay elements (24) which are controlled to have respective outputs representative of the sampling instants (Si) and a third group of controllable delay elements (26) which are controlled to have respective outputs representative of the phasing instants (Pi), the delay elements of the first, second and third groups being serially connected, respectively.

33. The transmission system according to claim 31, wherein said means for phasing and sampling includes a phase locked loop circuit having a phase comparator (21) with first and second inputs and an output, said first input (21a) receiving the clock signal directly and said second output supplying a phasing signal, digital control means (23) connected to said output of said comparator for generating a digital control signal (CTL), a first group of cascaded controllable delay elements (22), which first group of controllable delay elements has an input for receiving the clock signal and an output connected to said second input (21b) of said phase comparator, each of said controllable delay elements being controlled by said digital control signal to have a delay representative of said recurring period (R) of bits of said digital signal, an additional controllable delay element (24) which is controlled to have a delay (X) representative of the shorter of the sampling instants, which additional delay element receives the clock signal and is serially connected to a second group of cascaded controllable delay elements (22') which are controlled by said digital control signal to have a delay representative of said recurring period of said bits of said digital signal and to have respective outputs representative of the sampling instants (Si), and a third group of controllable delay elements (26) which are controlled to have respective outputs representative of the phasing instants (Pi) and are connected to respective outputs of the additional delay element and the delay elements of said second group.

34. The transmission system according to claim 33, wherein said phasing test instants are controlled in accordance with said phase deviation.

35. The transmission system according to claim 31, wherein said means for sampling includes means for determining limit values for a delay of said delayed sampling instants, means for shifting the delayed sampling instants when the delay of the delayed sampling instants reaches one of said limit values, and means for compensating for the shifting of the delayed sampling instants in order to reconstruct all bits of the digital signal.

36. The transmission system according to claim 35, wherein said phasing test instants are controlled in accordance with said phase deviation.

37. The transmission system according to claim 31, wherein said phasing means further includes means (30) for controlling said phasing test instants in accordance with said phase deviation.

38. An integrated circuit comprising a receiver (4) for receiving a serial digital signal (D) representative of bits recurring at a period (R) and having transitions, said receiver having an internal clock signal (C) having a period (T) which corresponds to a number of periods of the recurring bits in the digital signal, means (10) for phasing said digital signal with said clock signal and means (20) for sampling said digital signal at sampling instants (Si) to have samples (DSi) representative of the bits of the digital signal, said sampling instants being delayed from said clock signal by a delay Xi=kR/2+iR, where k is a positive whole odd number other than 0 and i is 0 and/or a positive whole number having a maximal value corresponding to said number of bit periods in said clock period less one, said phasing step including means for determining phasing test instants (Pi) to substantially occur at respective possible transitions of the digital signal, said phasing test instants being delayed from said sampling instants by a complementary delay Y=k'R/2, where k' is a positive whole odd number other than 0, and means connected to said determining means for comparing said phasing test instants with respective transition occurrences in the digital signal to determine a phase deviation therebetween, and said sampling means including means connected to said phase comparison means for controlling said sampling instants to be delayed from said clock signal in accordance with said phase deviation.

39. The integrated circuit according to claim 38, wherein said means for phasing and sampling includes a phase locked loop circuit having a phase comparator (21) with first and second inputs and an output, said first input (21a) receiving the clock signal directly and said second output supplying a phasing signal, digital control means (23) connected to said output of said comparator for generating a digital control signal (CTL), a first group of cascaded controllable delay elements (22), which first group of controllable delay elements has an input for receiving the clock signal and an output connected to said second input (21b) of said phase comparator, each of said controllable delay elements being controlled by said digital control signal to have a delay representative of said recurring period (R) of bits of said digital signal, a second group of controllable delay elements (24) which are controlled to have respective outputs representative of the sampling instants (Si) and a third group of controllable delay elements (26) which are controlled to have respective outputs representative of the phasing instants (Pi), the delay elements of the first, second and third groups being serially connected, respectively.

40. The integrated circuit according to claim 38, wherein said means for phasing and sampling includes a phase locked loop circuit having a phase comparator (21) with first and second inputs and an output, said first input (21a) receiving the clock signal directly and said second output supplying a phasing signal, digital control means (23) connected to said output of said comparator for generating a digital control signal (CTL), a first group of cascaded controllable delay elements (22), which first group of controllable delay elements has an input for receiving the clock signal and an output connected to said second input (21b) of said phase comparator, each of said controllable delay elements being controlled by said digital control signal to have a delay representative of said recurring period (R) of bits of said digital signal, an additional controllable delay element (24) which is controlled to have a delay (X) representative of the shorter of the sampling instants, which additional delay element receives the clock signal and is serially connected to a second group of cascaded controllable delay elements (22') which are controlled by said digital control signal to have a delay representative of said recurring period of said bits of said digital signal and to have respective outputs representative of the sampling instants (Si), and a third group of controllable delay elements (26) which are controlled to have respective outputs representative of the phasing instants (Pi) and are connected to respective outputs of the additional delay element and the delay elements of said second group.

41. The integrated circuit according to claim 40, wherein said phasing test instants are controlled in accordance with said phase deviation.

42. The integrated circuit according to claim 38, wherein said means for sampling includes means for determining limit values for a delay of said delayed sampling instants, means for shifting the delayed sampling instants when the delay of the delayed sampling instants reaches one of said limit values, and means for compensating for the shifting of the delayed sampling instants in order to reconstruct all bits of the digital signal.

43. The integrated circuit according to claim 42, wherein said phasing test instants are controlled in accordance with said phase deviation.

44. The integrated circuit according to claim 38, wherein said phasing means further includes means (30) for controlling said phasing test instants in accordance with said phase deviation.

* * * * *